United States Patent [19]

Clough

[11] Patent Number: 4,846,274

[45] Date of Patent: Jul. 11, 1989

[54] PROCESS FOR RECOVERING HYDROCARBON

[75] Inventor: Thomas J. Clough, Santa Monica, Calif.

[73] Assignee: Ensci, Incorporated, Woodland Hills, Calif.

[21] Appl. No.: 225,911

[22] Filed: Jul. 29, 1988

Related U.S. Application Data

[63] Continuation-in-part of Ser. No. 931,246, Nov. 17, 1986.

[51] Int. Cl.$^4$ .............................................. E21B 43/22
[52] U.S. Cl. ................................... 166/270; 166/268; 166/271; 208/244; 208/249
[58] Field of Search ................ 166/270, 268; 208/244, 208/249

[56] References Cited

U.S. PATENT DOCUMENTS

| | | | |
|---|---|---|---|
| 4,022,588 | 5/1977 | Dessau | 208/249 |
| 4,040,484 | 8/1977 | Hessert | 166/270 |
| 4,158,548 | 6/1979 | Burk et al. | 208/249 |
| 4,552,217 | 11/1985 | Wu et al. | 166/270 |

FOREIGN PATENT DOCUMENTS

| | | | |
|---|---|---|---|
| 1470471 | 3/1969 | Fed. Rep. of Germany | 208/244 |
| 4811321 | 2/1967 | Japan | 208/244 |
| 1141746 | 1/1969 | United Kingdom | 208/249 |

*Primary Examiner*—Asok Pal
*Attorney, Agent, or Firm*—Frank Uxa

[57] ABSTRACT

A process for recovering hydrocarbons from a subterranean hydrocarbon-bearing reservoir comprising:
contacting the reservoir with at least one metal component selected from the group consisting of vanadium components in which vanadium is present in the 5+ oxidation state in an amount effective to promote the chemical modification of at least one component of the hydrocarbons in the reservoir, iron components in which iron is present in the 3+ oxidation state in an amount effective to promote the chemical modification of at least one component of the hydrocarbons is the reservoir, manganese components in which manganese is present in the 3+ oxidation state in an amount effective to promote the chemical modification of at least one component of the hydrocarbons in the reservoir and mixtures thereof, and at least one oxygen transfer agent in an amount effective to do at least one of the following: maintain at least partially the promoting activity of the metal component; produce at least a portion of metal component; and oxidize at least a portion of the component of the hydrocarbons, the contacting occurring at conditions effective to chemically modify the component of the hydrocarbons in the reservoir; and
recovering hydrocarbons from the reservoir.

60 Claims, No Drawings

PROCESS FOR RECOVERING HYDROCARBON

RELATED APPLICATION

This application is a continuation-in-part of co-pending application Ser. No. 931,246, filed Nov. 17, 1986, still pending.

BACKGROUND OF THE INVENTION

This invention relates to a process for recovering hydrocarbons, such as petroleum and the like. More particularly, the invention relates to processes wherein hydrocarbons are recovered from subterranean hydrocarbon-bearing formations, i.e., reservoirs.

Producing petroleum from subterranean reservoirs has become increasingly difficult. A large portion of the original crude petroleum in place in many subterranean hydrocarbon-bearing reservoirs remains in place after primary production and water flooding. As oil reserves dwindle and exploration for new discoveries becomes more difficult and costly, the use of enhanced oil recovery (EOR) techniques on previously discovered resources will play an increasingly important role in the overall production of crude petroleum.

One EOR technique which has been used involves surfactant injection. However, such surfactants are relatively costly and are often not cost effective in producing increased quantities of hydrocarbon. A new EOR process would be beneficial.

SUMMARY OF THE INVENTION

A new process for recovering hydrocarbons which involves modifying at least one component of a hydrocarbon-based material has been discovered. This process provides an effective, convenient and economical approach to chemically modifying, preferably oxidizing, cracking, demetallizing, forming surfactants from, or altering the viscosity of or the like, one or more components of a hydrocarbon-based material, preferably petroleum.

One broad aspect of the present invention is directed to a process for recovering hydrocarbons from a subterranean hydrocarbon-bearing reservoir. In one embodiment, the invention comprises contacting the reservoir with at least one oxygen transfer agent, preferably a reducible manganese component, and at least one vanadium component and/or at least one iron component and/or at least one manganese component at conditions effective to chemically modify, preferably oxidize, at least one component of the hydrocarbons in the reservoir; and recovering hydrocarbons from the reservoir. Vanadium is present in the 4+ and/or 5+ oxidation states, preferably the 5+ oxidation state, in an amount effective to promote the chemical modification of the hydrocarbon component. Iron and/or manganese each is present in an amount in the 3+ oxidation state effective to promote the chemical modification of the hydrocarbon component. The vanadium component and/or the iron component and/or the manganese component is preferably substantially soluble at the conditions of use. The oxygen transfer agent, e.g., the reducible manganese component, may be substantially soluble at the conditions of use. The oxygen transfer agent is present during the contacting in an amount effective to do at least one of the following: maintain at least partially the promoting activity of the vanadium component and/or iron component; produce at least a portion of the vanadium component and/or iron component; and oxidize at least a portion of the component of the hydrocarbons in the reservoir.

In another broad aspect, the present process comprises contacting a subterranean hydrocarbon-bearing reservoir with at least one manganese (3+) complex with at least one ligand in which manganese is present in the 3+ oxidation state in an amount effective to promote the chemical modification of at least one component of the hydrocarbons in the reservoir, preferably with an oxidant, at conditions effective to chemically modify one or more of such components; and recovering hydrocarbons from the reservoir. A further broad aspect involves a hydrocarbon recovery process comprising contacting a subterranean hydrocarbon-bearing reservoir with at least one iron (3+) complex with at least one ligand in which iron is present in the 3+ oxidation state in an amount effective to promote the chemical modification of at least one component of the hydrocarbons in the reservoir. The contacting occurs in the presence of an oxidant at conditions effective to chemically modify the component of the hydrocarbons in the reservoir, and hydrocarbons are recovered from the reservoir. The oxidant useful in these embodiments is preferably an oxygen-containing component, in an amount effective to do at least one of the following: maintain at least partially the promoting activity of the manganese (3+) complex and/or iron (3+) complex; produce at least a portion of the manganese (3+) complex and/or iron (3+) complex; and oxidize at least a portion of the hydrocarbon in the reservoir. The contacting occurs in the presence of an oxidant at conditions effective to chemically modify the component of the hydrocarbons in the reservoir, and hydrocarbons are recovered from the reservoir.

The present process advantageously results in the chemical modification of one or more components of the hydrocarbons in the subterranean reservoir. Such chemical modification, preferably oxidation, of such component or components often results in enhanced recovery of hydrocarbons, e.g., more efficient and/or higher effective hydrocarbon yields, from the reservoir. For example, the present contacting may advantageously result in the in situ formation of surfactants, which surfactants aid in releasing hydrocarbons from the non-hydrocarbon-based portion of the subterranean reservoir, e.g., through emulsification, reduction of interfacial tension, and/or wetability changes, for example, oil wet to water wet. Further, oxidative cracking and/or oxidative viscosity reduction of crude petroleum, for example heavy crude oil, tends to increase the mobility of the petroleum through the subterranean reservoir, and to ultimately increase the recovery of petroleum. In certain aspects of this invention, oxidative emulsification can increase viscosity, thereby improving mobility control and better reservoir sweep efficiency for recovery of oil. The present invention can provide a cost effective approach to the enhanced recovery of hydrocarbons from subterranean reservoirs.

DETAILED DESCRIPTION OF THE INVENTION

The present process is effective to recover hydrocarbons from a subterranean hydrocarbon-bearing reservoir, preferably having at least one injection means, e.g., an injection well, in fluid communication with at least one production means, e.g., a production well.

In one embodiment of the invention, the process comprises: contacting the hydrocarbons in the reservoir with at least one of the following (1) at least one of certain vanadium and/or iron and/or manganese components present in an amount effective to promote the chemical modification of at least one component of the hydrocarbons in the reservoir and at least one oxygen transfer agent; (2) at least one manganese (3+) complex in an amount effective to promote such chemical modification; and/or (3) at least one iron (3+) complex in an amount effective to promote such chemical modification and at least one oxidant; and mixtures thereof; and recovering hydrocarbons from the reservoir. In one particularly useful embodiment, the process comprises injecting into the reservoir, preferably through the injection means, one or more liquid compositions or media, more preferably aqueous liquid media, including one or more of (1), (2) and (3) described above; and recovering hydrocarbons from the reservoir, preferably through the production means. A drive fluid is preferably injected into the reservoir, preferably through the injection means, to urge hydrocarbons in the reservoir toward the production means. This drive fluid may be separate and apart from the liquid medium described herein as contacting the reservoir. However, it is preferred that the liquid medium used to contact the reservoir also acts as a drive fluid, i.e., to urge hydrocarbons in the reservoir toward the production means.

The present process has been found to provide for recovery of hydrocarbons, e.g., crude petroleum, from subterranean hydrocarbon-bearing reservoirs. This enhanced oil recovery or EOR process is relatively inexpensive and cost effective for hydrocarbon recovery. For example, the vanadium components, iron components, manganese components, oxygen transfer agents, and oxidants, e.g., as described herein, which may be employed are relatively inexpensive, available and/or easy to produce.

The term "chemical modification" as used herein refers to a change in one or more of the components of the hydrocarbons in the subterranean reservoir, which change preferably results from the chemical reaction, more preferably oxidation, of one or more of such components. In certain instances, no specific chemical reaction can be pointed to account for the change in the component or components. For example, the hydrocarbons in the reservoir may become more easily emulsifiable, with water, as the result of the present contacting. This improved emulsifiability is a chemical modification as that term is used herein. Also, the chemical modification may occur with regard to the carbon and/or hydrogen portions of the hydrocarbons in the reservoir and/or to the other portions, e.g., such as contained sulfur, nitrogen, oxygen, metals or the like, of such hydrocarbons in the reservoir and/or acts to condition or enhance rock wetability changes to water wet and/or acts to improve mobility control and sweep efficiency. The present contacting step preferably produces surfactants in the reservoir and/or acts to reduce the viscosity of the hydrocarbons in the reservoir and/or acts to condition or enhance rock wetability changes to water wet and/or acts to improve mobility control sweep efficiency. The present contacting preferably liberates at least a portion of the hydrocarbons in the reservoir. That is, an increased amount of hydrocarbons is preferably recovered from the reservoir using the present contacting step relative to practicing a similar process without the present contacting step.

One embodiment of the present process involves contacting a subterranean hydrocarbon-bearing reservoir with at least one metal component selected from vanadium components, iron components, manganese components and mixtures thereof, and at least one oxygen transfer agent. The vanadium component is such that vanadium is present in the 4+ and/or 5+, preferably 5+, oxidation state in an amount effective to promote the chemical modification of at least one component of the hydrocarbons in the reservoir. The iron component is such that the iron is present in the 3+ oxidation state in an amount effective to promote the chemical modification of at least one component of the hydrocarbons in the reservoir. The manganese component is such that the manganese is present, preferably in the 3+ oxidation state, in an amount effective to promote the chemical modification of at least one component of the hydrocarbons in the reservoir. The oxygen transfer agent is present in an amount effective to do at least one of the following: maintain at least partially the promoting activity of the metal component; produce at least a portion of the metal component; and oxidize at least a portion of the component of the hydrocarbons in the reservoir.

Such contacting may occur over a wide pH range, e.g., about 3 or less to about 13 or more, preferably at a slightly acidic pH, i.e., a pH no lower than about 6, or at an alkaline pH. If vanadium is present, the contacting is more preferably conducted at a pH in the range of about 6 to about 13. If the iron component is present, the pH is more preferably about 6.5 to about 9.5. If manganese 3+ is present, the pH is more preferably about 7.5 to about 10.5. These more preferred pH ranges are particularly useful when it is desired to maintain the metal component substantially soluble, e.g., in the liquid medium, at the contacting conditions.

The vanadium component or components useful in the present invention may be chosen from any such components which function as described herein. Examples of useful components include vanadium pentoxide, soluble vanadates, and oxyanion derivatives thereof, complexes of vanadium with ligands and other compounds in which vanadium is present in the 5+ oxidation state. Preferably, the vanadium component or components are capable of being reduced to a lower oxidation state, e.g., to oxidize at least one component of the hydrocarbons in the reservoir, and of being oxidized to the 5+ oxidation state by the oxygen transfer agent at the contacting conditions. In one embodiment, the vanadium component or components are preferably substantially soluble in the liquid medium at the contacting conditions. A particulaly useful embodiment involves one or more vanadium (5+) complexes with ligands, which complexes, as well as the corresponding reduced forms during the time prior to reoxidation, are more preferably substantially soluble in the liquid medium at the contacting conditions.

The iron component or components useful in the present invention may be chosen from any such components which function as described herein. Preferably, the iron component or components are capable of being reduced to a lower oxidation state, e.g., to oxidize at least one component of the hydrocarbon in the reservoir, and of being oxidized to the 3+ oxidation state by the oxygen transfer agent or the oxidant at the contacting conditions. In certain embodiments, the iron component or components are preferably substantially soluble in the liquid medium at contacting conditions. A particularly useful embodiment involves iron (3+) complexes with ligands, which complexes, as well as the corresponding reduced forms during the time prior to reoxidation, are more preferably substantially soluble in the liquid medium at the contacting conditions.

The manganese component or components useful in the present invention may be chosen from any such components which function as described herein. Preferably, the manganese component or components are capable of being reduced to a lower oxidation state, e.g., to oxidize at least one component of the hydrocarbon in the reservoir, and of being oxidized to the 3+ oxidation state by the oxygen transfer agent or the oxidant at the contacting conditions. In certain embodiments, the manganese component or components are preferably substantially soluble in the liquid medium at contacting conditions. A particularly useful embodiment involves manganese (3+) complexes with ligands, which complexes, as well as the corresponding reduced forms during the time prior to reoxidation, are more preferably substantially soluble in the liquid medium at the contacting conditions.

The oxygen transfer agent or agents may be chosen from any suitable materials capable of functioning as described herein. In certain instances, non-metal-containing materials, such as molecular oxygen, may be employed. The oxygen transfer agent preferably includes at least one metal species which is capable of being reduced, e.g., to oxidize the vanadium or iron components, at the conditions of the present contacting. More preferably, the reduced oxygen transfer agent is capable of being oxidized to the oxygen transfer agent at the contacting conditions in the reservoir. The oxygen transfer agent preferably includes at least one oxygen species. In one particularly useful embodiment the oxygen transfer agent comprises a reducible redox cyclable manganese component.

By "reducible manganese component" or "RMC" is meant a manganese component which is capable of being chemically reduced at the conditions of the present contacting. Preferably, the RMC includes manganese, more preferably a major amount of manganese, in at least one of the 3+ and 4+ oxidation states. Particularly useful RMCs include manganese dioxide, i.e., $MnO_2$, soluble manganese in the (3+) oxidation state and mixtures thereof. The RMC can be provided from any suitable source, such as manganese halide and the like. The manganese component originally present may be subjected to oxidation, e.g., by contact with air and/or other manganese oxidant in the presence of base, in order to obtain and/or regenerate the presently useful RMC. The amount of RMC employed may vary over a wide range depending on, for example, the specific RMC being employed, what vanadium or iron component is being used, what, if any, oxidant is being used, the specific subterranean hydrocarbon-bearing reservoir being treated, and the type and degree of chemical modification desired. Preferably, the amount of RMC included in the present contacting step is sufficient to maintain the desired amount of vanadium in the 5+ oxidation state or the desired amount of iron in the 3+ oxidation state during the contacting. Substantial excesses of RMC should be avoided since such excesses may result in material separation and handling problems, and may even result in reduced recovery of hydrocarbons. In one embodiment, the reducible manganese component or components, are substantially soluble in the liquid medium at the contacting conditions. Such substantially soluble manganese components are preferably selected from manganese ligand (3+) complexes, as described above.

The metal component/reservoir contacting is preferably conducted in the presence of at least one additional oxidant, preferably other than the oxygen transfer agent. The oxidant is present in an amount effective to do so at least one of the following: maintain at least partially the promoting activity of the metal component; produce at least a portion of the oxygen transfer agent; and oxidize at least a portion of the component of the hydrocarbons in the reservoir. Such oxidant is preferably selected so as to produce, or at least maintain, an effective amount of the oxygen transfer agent during the contacting.

Without wishing to be limited to any particular theory of operation, an illustrative example of the vanadium/oxygen transfer agent/oxidant embodiment of the present invention is believed to function as follows. The vanadium (5+) component acts directly on the component or components of the hydrocarbons in the reservoir to be chemically, preferably oxidatively, modified. This interaction results in the vanadium species being reduced in oxidation state. The oxygen transfer agent, however, acts to oxidize this "reduced" vanadium to the 5+ oxidation state, and the oxidant oxidizes the resulting reduced oxygen transfer agent to the oxygen transfer agent. Such oxygen transfer agents, and in particular reducible manganese components, has been found to be effective in oxidizing the vanadium component to the 5+ oxidation state, while various other oxidants, such as molecular oxygen, are substantially ineffective in oxidizing the reduced vanadium component or components. However, molecular oxygen is effective to oxidize a reduced redox cyclable manganese component to a reducible manganese component and a reduced redox cyclable iron complex to an iron (3+) complex.

The vanadium (5+) complexes, iron (3+) complexes and manganese (3+) complexes useful in the present invention involve one or more ligands.

The presently useful metal complexes are preferably not fully complexed, for example, partial ligand complexes, i.e., not fully complexed at a ratio of ligand to metal which substantially reduces the redox cycling activity of the ligand complexes. This feature i.e., active redox cycling complexes, apparently facilitate the ability of the metal species to rapidly cycle between oxidation states and/or to promote the desired chemical modification, preferably oxidation, of the component of the hydrocarbons in the reservoir. With vanadium complexes, the mol ratio of vanadium to ligand is more preferably about 1 to about 3, still more preferably to about 2, with iron complexes the mol ratio of iron to ligand is more preferably about 1 to about 3, more preferably to about 2, and with manganese complexes the mol ratio of manganese to ligand is more preferably about 1 to about 2.0, still more preferably to about 1.5.

Any suitable ligand system may be employed. The ligands are preferably derived from the group consisting of compounds containing acetylacetonate functionality, carboxylic acid functionality (more preferably containing up to about 15 carbon atoms per molecular), poly, more preferably three, carboxylic acid functionalities, substituted carboxylic acid functionality (more preferably containing up to about 15 carbon atoms per molecule) poly, more preferably three, substituted carboxylic acid functionalities, polyoxy anions more preferably polyphosphates for exaple tripolyphosphate and mixtures thereof. Particularly useful ligand systems are derived from the group consisting of compounds containing acetylacetonate functionality, citric acid functionality, tartaric acid functionality, nitrilotriacetic acids functionality and mixtures thereof and their partial salts, and partial esters and substituted derivatives thereof. Particularly preferred species are citric acid, tartric acid and nitrilotriacetic acid and their partial salts and esters thereof as illustrated above.

Further examples of iron (3+) complexes useful in the present invention include iron complexes with polyfunctional amines, for example, ethylenediamine, propylene diamine, ethanol amine, glycine and asparagine and salts thereof; phosphonic acids and phosphonic acid salts, for example, ethane-1-hydroxy-1, 1-diphosphonic acid; pyridine and substituted, chelating pyridine, derivatives, for example, 1, 10-phenanthroline, 2, 2'-bipyridyl, glyoxine and salicylaldehyde derivatives; aquo; and $CN^-$. Among the particularly preferred iron complexing agents for use in the present invention are those selected from the group consisting of substituted, chelating derivatives of pyridine, aquo, $CN^-$ and mixtures thereof.

Especially suitable salt forms of ligands are the potassium, sodium and ammonium salts. Mixtures of ligands can be employed.

In certain embodiments, the present invention involves the use of at least one oxidant in an amount effective to do at least one of the following: maintain at least partially the promoting activity of the vanadium, iron and/or manganese, the vanadium 5+ component complex, the manganese 3+ complex and/or the iron 3+ complex; produce at least a portion of such component(s) and/or complex(es); produce or function as at least a portion of the oxygen transfer agent; and/or oxidize at least a portion of the components of the hydrocarbons in the reservoir. The oxidant or oxidants may and preferably should be present during the contacting step and/or during a separate step to form and/or regenerate such component(s) and/or complex(es) and/or to form and/or function as such oxygen transfer agent.

Any suitable oxidant capable of performing one or more of the above-noted functions may be employed. The oxidant is preferably selected from the group consisting of molecular oxygen (e.g. in the form of air, dilute or enriched air, or other mixtures with nitrogen or carbon dioxide), singlet oxygen, ozone, inorganic oxidant components containing oxygen and at least one metal, preferably manganese, and mixtures thereof. More preferably, the oxidant is selected from the group consisting of molecular oxygen, oxidant components containing oxygen and at least one metal and mixtures thereof, especially molecular oxygen. A particularly preferred oxidant comprises a mixture of molecular oxygen with carbon dioxide in an amount effective to promote the molecular oxygen access to and contact with the hydrocarbons in the reservoir. The use of carbon dioxide has been found to enhance the chemical modification, e.g., oxidation, of the component or components of the hydrocarbon in the reservoir. Although carbon dioxide may be used alone, i.e., substantially without an oxidant, it is preferably employed with an oxidant, and more preferably with molecular oxygen. When used with molecular oxygen, the carbon dioxide is preferably present in an amount in the range of about 1.0 to about 1000 moles of carbon dioxide per mole of molecular oxygen. Care should be exercised to avoid using carbon dioxide in amounts which substantially detrimentally affect the pH of the contacting liquid medium, e.g., reduce the pH of the liquid medium below the desired level of solubility useful for metal component hydrocarbon modification, e.g., oxidation, activity.

The specific amount of vanadium, iron and/or manganese component, oxygen transfer agent, and/or oxidant used to contact the subterranean hydrocarbon-bearing reservoir is not narrowly critical to the present invention. However, such amount or amounts should be sufficient to perform the function or functions as described herein. The amount or amounts of one or more of these materials to be used depends on many factors, for example, the specific reservoir to be treated and the reservoir conditions to be encountered, and the type and degree of chemical modification desired. In certain applications, the amount of each of the vanadium, iron and/or manganese components and the reducible manganese component, preferably is in the range of about 0.005% to about 1%, more preferably about 0.01% to about 0.5%, by weight (calculated as elemental metal) of the liquid medium, e.g., added at, for example, a reservoir pore volume in the range of about 0.1 to about 2. In the event such materials are substantially soluble in the liquid medium, each of them is preferably present in the liquid medium in an amount in the range of about 0.005% to about 0.5% by weight (calculated as elemental metal).

Any suitable liquid medium may be employed. Because of cost and availability considerations, it is preferred that the liquid medium be an aqueous liquid medium. The liquid medium may also include one or more components, e.g., basic materials, such as sodium hydroxide sodium orthosilicates, sodium carbonate and/or sodium bicarbonate, useful for controlling the pH of the liquid medium and/or for the in situ (in the subterranean reservoir) production of one or more surfactants.

The present contacting preferably takes place in the presence of an aqueous liquid medium, more preferably a slightly acidic or alkaline aqueous liquid medium. Any suitable aqueous liquid medium or composition may be employed in the present contacting step. The pH of the composition preferably is slightly acidic or alkaline and may vary depending, for example, on the specific reservoir being treated, and the make-up of the contacting composition. More preferably, when vanadium is employed, the pH of the aqueous liquid medium is in the range of about 6 to about 13. When iron 3+ is present, it is more preferred that the pH be in the range of about 6.5 to about 9.5, and when manganese 3+ is present, it is more preferred that the pH be in the range of about 7.5 to about 10.5.

The pH of the aqueous liquid medium may be adjusted or maintained during the contacting step, for example, by adding one or more basic components to the aqueous liquid medium. Any suitable basic component or combination of such components may be included in, or added to, this medium to provide the desired basicity. For example, basic alkali metal and alkaline earth metal components, e.g., hydroxides, silicates, carbonates and bicarbonates, mixtures thereof and the like may be employed. Because of cost, availability and performance considerations, sodium carbonate, sodium hydroxide, sodium silicate and mixtures thereof are preferred.

The aqueous liquid medium comprises water, preferably a major amount of water. This medium is preferably substantially free of ions and other entities which have a substantial detrimental effect on the present process. Quantity and concentration of the liquid aqueous medium may be selected in accordance with the requirements of any given reservoir to the treated and as may be found advantageous for any given mode of applying the process in practice. In carrying out the present process, one or more wetting agents and/or dispersion agents can be included in, e.g., added to, the aqueous composition (in addition to the other components set forth herein) to further enhance rates and/or hydrocarbon recovery yields. Examples of such agents include hydrocarbon sulfonates, lignosulfonates, alkyl substituted succinic anhydrides, alcohol ethoxylates and the like.

One important feature of the present invention is that it may be effectively practiced in the presence of brine which is often present in subterranean reservoirs, for example, after conventional water flooding. Thus, no "special" pretreatment of the reservoir is needed to employ the present process. Put another way, the present process may be employed substantially without regard to the prior processing history of the reservoir. Thus, increased yields of hydrocarbons can be recovered from reservoirs whether they have or have not been previously water flooded and/or subjected to one or more other EOR processes. In addition, in certain instances, the present process may be advantageously used on a reservoir where primary recovery processing has not been employed.

Any suitable drive fluid may be used in the present process in combination with the liquid medium. For example, the drive fluid may be selected from the group consisting of methane, ethane, propane, natural gas, nitrogen, air, combustion flue gas, carbon dioxide, water, brine and mixtures thereof. In one embodiment, the drive fluid is preferably an aqueous composition. The drive fluid preferably includes a source of oxygen in an amount effective to provide at least a portion of the oxidant, as described herein. The choice of a specific drive fluid for use in the present invention depends of various factors, for example, the specific liquid medium being used, and the specific reservoir and reservoir conditions to be encountered. The amount of drive fluid is such to urge or push the liquid medium toward the production means, e.g., production well or wells. The amount of drive fluid injected may range up to 100% or more of the reservoir pore volume, based on the volume of the drive fluid at the conditions present in the reservoir. The rate of drive fluid injection into the reservoir is preferably such that the liquid medium sweeps or moves through the reservoir at a substantially constant rate, i.e., distance per unit time.

It is preferred that the liquid medium including the metal components, etc., noted herein, be injected into the reservoir in a fashion so as to also act as a drive fluid. In this embodiment, the liquid medium is preferably injected in an amount in the range of about 20% to about 100% or more of the reservoir pore volume.

The liquid medium, including the metal components noted herein, may be injected into the reservoir in slugs, for example alternating liquid medium and/or polymer drive/pusher slugs. The amounts of liquid medium and drive fluid injected into the reservoir may vary widely, depending on various factors, provided that such amounts and proportions act to provide for hydrocarbon recovery. If the liquid medium is injected as slugs, the size of the individual slugs of liquid medium injected preferably range up to about 10%, more preferably up to about 50%, of the reservoir pore volume.

The conditions at which the present contacting in the subterranean reservoir occurs may vary widely. In certain EOR processing applications, it may not be possible to effectively control the temperature and/or pressure of the subterranean reservoir during the contacting step and/or to effectively control the time during which the contacting occurs.

The present process provides for substantial hydrocarbon recovery without requiring the use of relatively expensive surfactants, such as those used and/or proposed for chemical flooding. Also, substantially no additional hydrocarbon need be injected. Thus, the present process involves less cost and may have improved effectiveness at elevated reservoir temperatures relative to process using chemical flooding process. In certain applications, the injection of one or more surfactants, polymers or foams, such as those conventionally used in EOR processing, may have a beneficial effect on the recovery of hydrocarbons in the present invention.

The following non-limiting examples illustrate certain of the advantages of the present invention.

EXAMPLES 1 TO 6

A quantity of heavy Alaskan North Slope crude oil was selected from bench scale testing.

Each experiment, including control Example 1, employed 50 ml of this crude oil (except Example 2, as noted below), 160 ml of an aqueous fraction and 80 g of sand, in order to better approximate subterranean reservoir conditions. Each of the systems was agitated by a propeller stirrer in a tall and narrow glass container suspended in a water bath maintained at 50° C. 16 drops of a commercially available emulsifier waas added to each system to aid in oil/water contacting. This emulsifier did not form any type of permanent emulsion. The conditions and results of each of these experiments are summarized as follows.

EXAMPLE 1

(Control)

Conditions: 160 ml of pH 9–10 aqueous solution; 50 ml of crude oil; 80 g of sand; 50° C.; 3 days stirring.

Results: Upon termination of stirring, the oil/water layers separated within 30 seconds to one minute. Some solid (sand) remained in the water. However, no visible effect was apparent on the crude oil fraction.

EXAMPLE 2

Conditions: 160 ml of pH 6.5 solution; 40 ml of crude oil; 80 g of sand; 4 g of $M_nO_2$; 3.2 g of NaCl; 0.8 g of $NH_4Cl$; 30° C.; slow air bubbling; 3 days stirring.

Results: Upon termination of stirring, there were no visible effects on the oil with this "$M_nO_2$ only" system. Very fine $M_nO_2$ particles were slow to settle, and some particles may have remained in the oil layer. Water/oil separation was very rapid, i.e., in a matter of minutes, with no differences from the control experiment (Example 1).

EXAMPLE 3

Conditions: The aqueous fraction included 0.5% by weight of vanadium, as vanadium citrate (1.5 mol citrate:1 mol vanadium); 160 ml of pH 12 aqueous fraction; 7.4 g of $MnO_2$; 50 ml of crude oil; 80 g sand; 50° C.; 3 days stirring.

Results: Upon termination of stirring, an emulsion formed. The oil/water layers separated in 15–30 minutes, with small amounts of solid (sand, $MnO_2$) remaining in the oil layer.

EXAMPLE 4

Conditions: Same as Example 3, except that aqueous fraction also included 0.3% by weight of manganese, as manganese citrate (1.33 mol citrate:1 mol manganese), and the pH was reduced to 9.

Results: Upon termination of stirring, an emulsion formed. The oil/water layers separated in 1 to 1.5 hours, with small amounts of solid (sand, $MnO_2$) remaining in the oil layer. The aqueous layer was brown in color indicative of $Mn^{3+}$ (citrate). There appeared to have been more emulsion formation that was apparent in Example 3.

EXAMPLE 5

Conditions: Same as Example 4, except that air was introduced via very slow bubbling (one bubble every 3–5 seconds), and this experiment was run for 7 days.

Results: Upon termination of stirring, an emulsion formed. The oil/water layers separated in 1.5 to 2 hours, with small amounts of solid (sand, $MnO_2$ remaining in the oil layer. After separation, the oil layer appeared to be larger than it was originally, indicating that some type of permanent emulsion had been formed. The formation of oil emulsions makes hydrocarbons in subterranean reservoirs more susceptible to being recovered. Without wishing to be limited to any particular theory of operation, the small amount of air introduced in this run may have been beneficial in keeping the manganese in the 3+ oxidation state, which manganese 3+ it is believed was able to regenerate vanadium 5+ (citrate) without any involvement from the $MnO_2$.

EXAMPLE 6

Conditions: Same as Example 5, except that the experiment was run for 3 days.

Results: After termination of stirring, an emulsion formed. The oil/water layers separated in 1.5 to 2 hours, with some solid (sand, $MnO_2$) remaining in the oil layer. As in Example 5, the oil layer appeared to have the characteristics of some type of permanent emulsion.

These examples show that the combination of vanadium and manganese, particularly such metals partially complexed with ligands, an oxygen transfer agent such as $MnO_2$, and an oxidant, such as air, is effective to provide hydrocarbon recovery from subterranean reservoirs. Note that Examples 1 and 2, with none of the presently useful materials, showed little or no effect on the crude oil.

EXAMPLE 7

A crude petroleum-bearing, porous reservoir is produced, using conventional primary recovery methods, until it is determined that enhanced oil recovery is needed to effectively and economically produce the reservoir further. Injection wells into the reservoir are strategically located, in a conventional manner, relative to the producing wells so that fluid injected in the injection wells would tend to sweep crude petroleum remaining in the reservoir toward the production wells for recovery.

Seawater (brine) is injected into the reservoir through the injection wells. A quantity of crude petroleum is recovered. This waterflood/crude petroleum recovery continues until it is determined that additional enhanced oil recovery is needed to effectively and economically produce the reservoir further.

A combination of brine, manganese (3+) citrate, vanadium (5+) citrate and sufficient sodium carbonate to provide a pH of about 10 is prepared. This combination is injected as a slug into each of the injection wells, in amounts so that a total of about 50% by volume of the pore space of the reservoir of the combination is injected. Air is also injected into each of the injection wells along with the slugs of the above-noted combination. This injection is followed by a mixture of polymer and water, optionally with air which is injected into each of the injection wells. The pH of the reservoir is controlled at about 10 by addition of sodium carbonate. A quantity of crude petroleum is economically recovered.

EXAMPLE 8

A crude petroleum-bearing, porous reservoir is produced, using conventional primary recovery methods, until it is determined that enhanced oil recovery is needed to effectively and economically produce the reservoir further. Injection wells into the reservoir are strategically located, in a conventional manner, relative to the producing wells so that fluid injected in the injection wells would tend to sweep crude petroleum remaining in the reservoir toward the production wells for recovery.

Seawater (brine) is injected into the reservoir through the injection wells. A quantity of crude petroleum is recovered. This waterflood/crude petroleum recovery continues until it is determined that additional enhanced oil recovery is needed to effectively and economically produce the reservoir further.

An aqueous manganese chloride solution at a pH of 6–7 is injected into the reservoir. A combination of brine, vanadium (5+) citrate, and sufficient sodium hydroxide to provide a pH of about 10 is injected into the reservoir through the injection wells. This alkaline combination interacts with the manganese chloride to form a very high surface area heterogeneous oxide catalyst which is distributed substantially throughout the reservoir. This heterogeneous catalyst promotes the reaction, e.g., oxidation, cracking and the like, of the petroleum in the reservoir to produce petroleum acids and other reaction by-products. An initial high acid number of the petroleum in the reservoir is not required. The petroleum acids and other reaction by-products react with the alkaline combination resulting in in situ reservoir of surfactants. The oxidative cracking of petroleum in the reservoir may help change crude oil mobility and recovery through oxidative viscosity reduction.

The injection of this alkaline combination is followed by a mixture of polymer and water, optionally with air which is injected into each of the injection wells. The pH of the reservoir is controlled at about 10 by addition of sodium hydroxide. A quantity of crude petroleum is economically recovered.

The use of the present EOR process does not require that the porous reservoir be previously waterflooded or subjected to any other EOR process. Good results are obtained if the present process is used on a reservoir directly after primary recovery methods are used. In certain situations, the present process may be employed without first using such primary production techniques.

While this invention has been described with respect to various specific examples and embodiments, it is to be understood that the invention is not limited thereto and that it can be variously practiced within the scope of the following claims.

What is claimed is:

1. A process for recovering petroleum hydrocarbons from a subterranean, petroleum hydrocarbon-bearing reservoir comprising:

contacting said reservoir with at least one metal component selected from the group consisting of vanadium components in which vanadium is present in the 5+ oxidation state in an amount effective to promote the chemical reaction of at least one component of said petroleum hydrocarbons in said reservoir, iron components in which iron is present in the 3+ oxidation state in an amount effective to promote the chemical reaction of at least one component of said petroleum hydrocarbons in said reservoir, manganese components in which manganese is present in the 3+ oxidation state in a amount effective to promote the chemical reaction of at least one component of said petroleum hydrocarbons in said reservoir and mixtures thereof, and at least one oxygen transfer agent in an amount effective to do at least one of the following: maintain at least partially the promoting activity of said metal component; produce at least a portion of said metal component; and oxidize at least a portion of said component of said petroleum hydrocarbons in said reservoir, said contacting occurring at conditions effective to chemically react said component of said petroleum hydrocarbons in said reservoir to enhance the liberation of said petroleum hydrocarbons in said reservoir; and recovering petroleum hydrocarbons from said reservoir.

2. The process of claim 1 wherein said oxygen transfer agent is present in an amount effective to maintain at least partially the promoting activity of said metal component.

3. The process of claim 1 wherein said metal component is present in an aqueous liquid medium during said contacting.

4. The process of claim 3 wherein said metal component is substantially soluble in said aqueous liquid medium at said contacting conditions.

5. The process of claim 1 wherein said oxygen transfer agent is a reducible manganese component.

6. The process of claim 1 wherein said oxygen transfer agent is present in an aqueous liquid medium during said contacting and is substantially soluble in said aqueous medium at said contacting conditions.

7. The process of claim 5 wherein said reducible manganese component is selected from the group consisting of manganese 3+ components, manganese 4+ components and mixtures thereof.

8. The process of claim 5 wherein said reducible manganese component is manganese dioxide.

9. The process of claim 5 wherein said reducible manganese component includes at least one manganese (3+) ligand complex.

10. The process of claim 9 wherein said manganese (3+) ligand complex is a partial ligand complex.

11. The process of claim 9 wherein said manganese (3+) ligand complex has a mol ratio of manganese to ligand in the range of about 1 to about 1.5.

12. The process of claim 1 wherein said vanadium component includes at least one vanadium (5+) ligand complex, and said iron component includes at least one iron (3+) ligand complex.

13. The process of claim 12 wherein said vanadium 5+ ligand complex and said iron 3+ ligand complex are partial ligand complexes.

14. The process of claim 9 wherein said vanadium component includes at least one vanadium (5+) ligand complex and said iron component includes at least one iron (3+) ligand complex.

15. The process of claim 12 wherein at least one of said vanadium (5+) complex and said iron (3+) complex includes a ligand derived from the group consisting of compounds having acetylacetonate functionality, carboxcylic acid functionalities, substituted carboxcylic acid functionalities and mixtures thereof.

16. The process of claim 14 wherein at least one of said vanadium (5+) complex, said iron (3+) complex and said manganese (3+) complex include a ligand derived from the group consisting of compounds having acetylacetonate functionality, carboxcylic acid functionalities, substituted carboxcylic acid functionalities and mixtures thereof.

17. The process of claim 15 wherein said compounds having carboxylic acid functionalities or substituted carboxylic acid functionalities include up to about 15 carbon atoms per molecule.

18. The process of claim 17 wherein said compounds having carboxylic acid functionalities or substituted carboxylic acid functionalities include up to about 15 carbon atoms per molecule.

19. The process of claim 12 wherein at least one of said vanadium (5+) complex and said iron (3+) complex includes a ligand derived from the group consisting of compounds having acetylacetonate functionality, citric acid functionality, tartaric acid functionality, nitrilotriacetic acid functionality and mixtures thereof.

20. The process of claim 14 wherein at least one of said vanadium (5+) complex, said iron (3+) complex and said manganese (3+) complex include a ligand derived from the group consisting of compounds having acetylacetonate functionality, citric acid functionality, tartaric acid functionality, nitrilotriacetic acid functionality and mixtures thereof.

21. The process of claim 9 wherein said ligand is derived from the group consisting of compounds having acetylacetonate functionality, citric acid functionality, tartaric acid functionality, nitrilotriacetic acid functionality and mixtures thereof.

22. The process of claim 13 wherein said vanadium (5+) complex has a mol ratio of vanadium to ligand in the range of about 1 to about 2; and said iron (3+) complex has a mol ratio of iron to ligand in the range of about 1 to about 2.

23. The process of claim 14 wherein said vanadium (5+) complex has a mol ratio of vanadium to ligand in the range of about 1 to about 2; said iron (3+) complex has a mol ratio of iron to ligand in the range of about 1 to about 2; and said manganese (3+) complex has a mol ratio of manganese to ligand of about 1 to about 1.5.

24. The process of claim 1 wherein said metal component is at least one of said vanadium components, and said contacting occurs at a pH in the range of about 3 to about 13.

25. The process of claim 1 wherein said metal component is at least one of said vanadium components and said contacting occurs at a pH in the range of about 7 to about 13.

26. The process of claim 1 wherein said metal component is at least one of said iron components and said contacting occurs at an alkaline pH.

27. The process of claim 1 wherein said metal component is at least one of said iron components and said contacting occurs as a pH in the range of about 6.5 to about 9.5.

28. The process of claim 26 wherein said iron component is an iron (3+) complex with at least one ligand derived from an iron complexing agent selected from the group consisting of poly-functional amines and salts thereof, phosphoric acids and salts thereof, pyridine and substituted, chelating pyridines derivatives, glyoxine and salicylaldehyde derivatives, condensed phosphates and mixtures thereof.

29. The process of claim 1 wherein said contacting occurs in the presence of an oxidant other than said oxygen transfer agent, said oxidant being present in an amount effective to do at least one of the following: maintain at least partially the promoting activity of said metal components; produce at least a portion of said oxygen transfer agent; and oxidize at least a portion of said component of said petroleum hydrocarbons in said reservoir.

30. The process of claim 29 wherein said oxidant is an oxygen-containing component.

31. The process of claim 29 wherein said oxidant is molecular oxygen.

32. A process for recovering petroleum hydrocarbons from a subterranean, petroleum hydrocarbon-bearing reservoir comprising:
contacting said reservoir with at least one manganese (3+) ligand complex ligand in an amount effective to promote the oxidation of at least one component of said hydrocarbons in said reservoir, said contacting occurring at conditions effective to oxidize said component of said hydrocarbons in said reservoir to enhance the liberation of said petroleum hydrocarbons in said reservoir, said contacting occurs in the presence of an oxidant other than said manganese (3+) complex, said oxidant being present in an amount effective to do at least one of the following: maintain at least partially the promoting activity of said manganese (3+) complex; produce at least a portion of said manganese (3+) complex; and oxidize at least a portion of said component of said hydrocarbons in said reservoir; and
recovering petroleum hydrocarbons from said reservoir.

33. The process of claim 32 wherein said manganese (3+) complex is present in an aqueous liquid medium during said contacting.

34. The process of claim 33 wherein said manganese (3+) complex is substantially soluble in said aqueous liquid medium at said contacting conditions.

35. The process of claim 32 wherein said manganese (3+) complex is a partial ligand complex.

36. The process of claim 32 wherein said manganese (3+) complex has a mol ratio of manganese to ligand in the range of about 1 to about 1.5.

37. The process of claim 32 wherein said ligand is derived from the group consisting of compounds having acetylacetonate functionality, carboxylic acid functionalities, substituted carboxylic acid functionalities and mixtures thereof.

38. The process of claim 37 wherein said compounds having carboxylic acid functionalities or substituted carboxylic acid functionalities include up to about 15 carbon atoms per molecule.

39. The process of claim 32 wherein said ligand is derived from the group consisting of compounds having acetylacetonate functionality, citric acid functionality, tartaric acid functionality, nitrilotriacetic acid functionality and mixtures thereof.

40. The process of claim 32 wherein said contacting occurs in the presence of at least one oxygen transfer agent in an amount effective to do at least one of the following: maintain at least partially the promoting activity of said manganese (3+) complex; produce at least a portion of said manganese (3+) complex; and oxidize at least a portion of said component of said petroleum hydrocarbons in said reservoir.

41. The process of claim 40 wherein said oxygen transfer agent is a reducible manganese component.

42. The process of claim 40 wherein said oxygen transfer agent is manganese dioxide.

43. The process of claim 32 wherein said contacting occurs at a pH in the range of about 7.5 to about 10.5.

44. The process of claim 32 wherein said oxidant is an oxygen-containing component.

45. The process of claim 32 wherein said oxidant is molecular oxygen.

46. A process for recovering petroleum hydrocarbons from a subterranean, petroleum hydrocarbon-bearing reservoir comprising:
contacting said reservoir with at least one iron (3+) complex with at least one ligand in an amount effective to promote the oxidation of at least one component of said petroleum hydrocarbons in said reservoir, said contacting occurring in the presence of an oxidant in an amount effective to do at least one of the following: maintain at least partially the promoting activity of said iron (3+) complex; produce at least a portion of said iron (3+) complex; and oxidize at least a portion of said component of said petroleum hydrocarbons in said reservoir, said contacting occurring at conditions effective to oxidize said component of said petroleum hydrocarbons in said reservoir to enhance the liberation of said petroleum hydrocarbons in said reservoir; and
recovering petroleum hydrocarbons from said reservoir.

47. The process of claim 46 wherein said iron (3+) complex is present in an aqueous liquid medium during said contacting.

48. The process of claim 46 wherein said iron (3+) complex is substantially soluble in said aqueous liquid medium at said contacting conditions.

49. The process of claim 46 wherein said iron (3+) complex is a partial ligand complex.

50. The process of claim 46 wherein said iron (3+) complex has a mol ratio of iron to ligand in the range of about 1 to about 2.

51. The process of claim 46 wherein said ligand is derived from the group consisting of compounds having acetylacetonate functionality, carboxylic acid functionalities, substituted carboxylic acid functionalities and mixtures thereof.

52. The process of claim 51 wherein said compounds having carboxylic acid functionalities or substituted carboxylic acid functionalities include up to about 15 carbon atoms per molecule.

53. The process of claim 46 wherein said ligand is derived from the group consisting of compounds having acetylacetonate functionality, citric acid functionality, tartaric acid functionality, nitrilotriacetic acid functionality and mixtures thereof.

54. The process of claim 46 wherein said iron (3+) complex with at least one ligand is derived from an iron complexing agent selected from the group consisting of poly-functional amines and salts thereof, phosphoric acids and salts thereof, pyridine and substituted, chelating pyridines derivatives, glyoxine and salicylaldehyde derivatives, condensed phosphates and mixtures thereof.

55. The process of claim 46 wherein said contacting occurs at an alkaline pH.

56. The process of claim 46 wherein said contacting occurs at a pH in the range of about 6.5 to about 9.5.

57. The process of claim 46 wherein said oxidant is an oxygen-containing component.

58. The process of claim 46 wherein said oxidant is molecular oxygen.

59. The process of claim 1 wherein said chemical reaction comprises oxidation, and said contacting occurs at conditions effective to oxidize said component of said petroleum hydrocarbons.

60. The process of claim 1 wherein said chemical reaction comprises at least one of the following: (1) in situ formation of surfactants; (2) demetallization; (3) oxidative cracking; (4) oxidative viscosity alteration and (5) oxidative emulsification, and said contacting occurs at conditions effective to subject said component of said petroleum hydrocarbons to said chemical reaction.

* * * * *

UNITED STATES PATENT AND TRADEMARK OFFICE
CERTIFICATE OF CORRECTION

PATENT NO. : 4,846,274
DATED : July 11, 1989
INVENTOR(S) : Thomas J. Clough

It is certified that error appears in the above—identified patent and that said Letters Patent is hereby corrected as shown below:

Column 10, line 37 change "waas" to -- was --.

Signed and Sealed this

Tenth Day of April, 1990

Attest:

HARRY F. MANBECK, JR.

*Attesting Officer*   *Commissioner of Patents and Trademarks*